Jan. 7, 1941. G. T. HART, JR 2,228,136
SOLE ATTACHING UTILIZING STRAY ELECTROSTATIC FIELD
Filed March 1, 1940
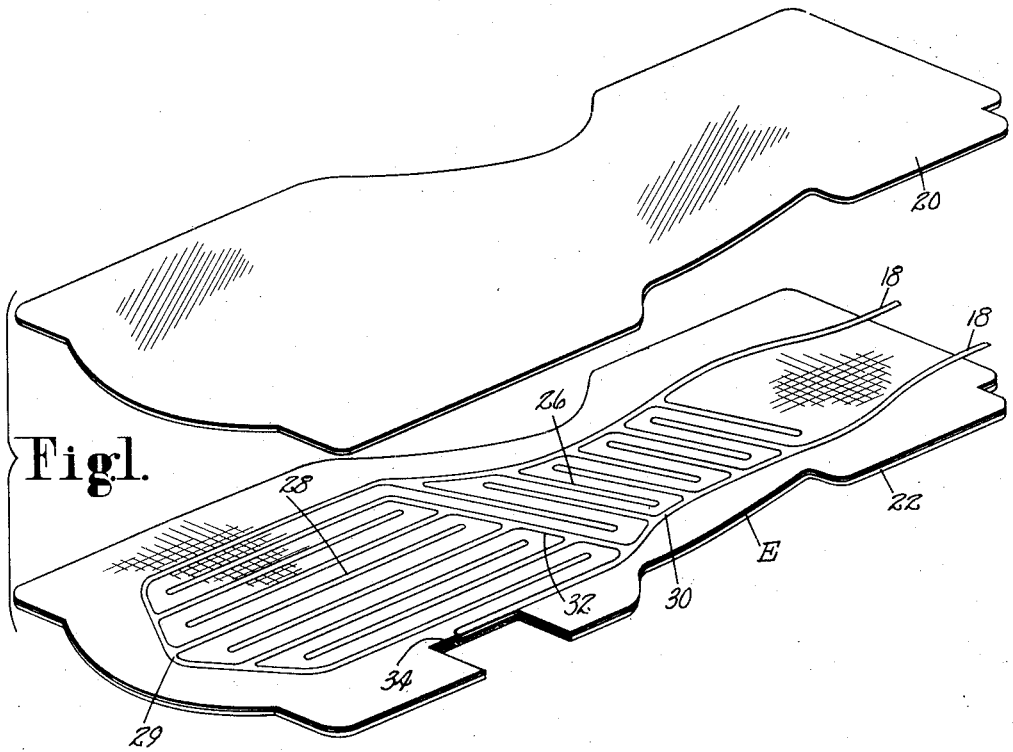
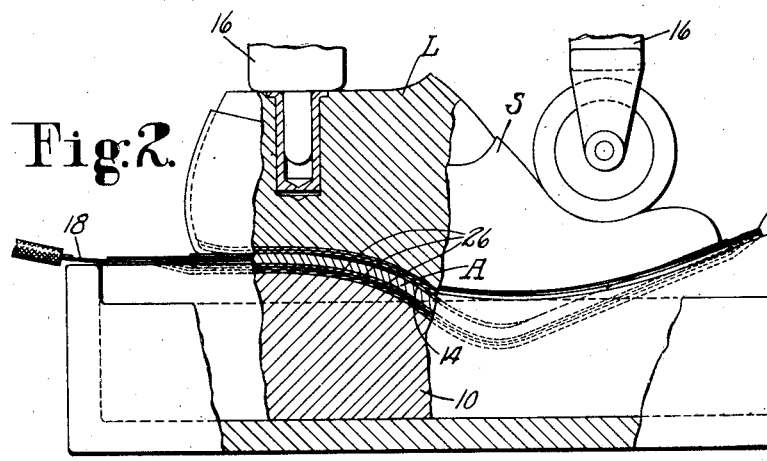
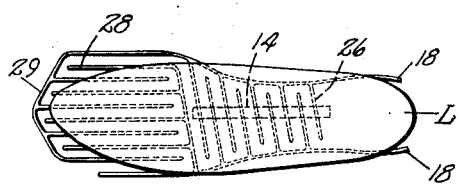
INVENTOR
George T. Hart, Jr.
By his Attorney
Victor Cobb.

Patented Jan. 7, 1941

2,228,136

UNITED STATES PATENT OFFICE 2,228,136

SOLE ATTACHING UTILIZING STRAY ELECTROSTATIC FIELD

George T. Hart, Jr., Lynn, Mass., assignor to United Shoe Machinery Corporation, Borough of Flemington, N. J., a corporation of New Jersey Application March 1, 1940, Serial No. 321,736

5 Claims. (Cl. 12—38)

This invention relates to methods of and apparatus for attaching outsoles to shoes by means of adhesive. As illustrated herein, the invention is concerned with the utilization of a stray electrostatic field for heating a film of adhesive positioned between an outsole and a shoe to which it is to be attached.

In utilizing an electrostatic field as for the production of heat, suitable electrodes, such as plates, are frequently employed. These plates form a condenser which sets up a field in which the article to be treated is positioned, usually between the two plates. For many purposes, however, it has been found that instead of using the direct field, the stray or fringe field may advantageously be employed. This is set forth in Letters Patent of the United States No. 2,212,522, granted August 27, 1940, upon the application of Hart & Winkley, for Improvements in the use of a stray electrostatic field for drying leather and the like.

In cement-attaching outsoles to shoes, an adhesive, which may be of the thermoplastic type, is usually applied in a marginal band to the overlasted margin of the upper on the bottom of a shoe and also to the margin of the flesh surface of the outsole which is to be attached thereto. This adhesive is applied in solution and then allowed to dry before the outsole and shoe are brought together in a sole-attaching machine. Previously it has been proposed to apply heat to activate the adhesive in such an operation by means of electrodes which produce a direct electrostatic field and are positioned respectively on the bottom of the last and on the top of the pad of the machine. Such an arrangement involves the very serious disadvantage that the electrode plate inside the shoe must be an integral part of the last; otherwise, the shoe produced will be misshapen. If the plate is added to an existing last, the shoe will be deeper and of a larger girth than was intended by the designer of the last. This means that the shoe manufacturer must either discard his present equipment and provide himself with a new set of lasts or the present equipment must be rebuilt for the purpose. Either one of these changes would be decidedly expensive.

Accordingly, an important object of the invention resides in an improved method of sole attaching by adhesive, in which the cement to be activated is subjected to the action of a stray electrostatic field derived from electrodes both of which are located between the shoe and the major portion of the pad of the sole-attaching machine.

Another important object of the invention is to devise, for use in a sole-attaching machine, an improved electrode structure of the grid type which may be located wholly outside of the shoe and which is of sufficient flexibility so that it may be positioned between the shoe and the principal part of the sole-attaching pad.

In the successful employment of an electrostatic field for sole attaching, considerable care must be exercised to maintain sufficient spacing between any two electrode members to prevent the formation of a corona discharge and sparking sufficient to burn the leather. If, then, the arrangement of the electrode is such that the bending of it produced by the application of pressure to the shoe sole will distort the intended relation of the electrode strips, trouble is apt to be experienced. Another source of difficulty lies in the distortion of the field which results from the positioning therein of a metallic body, such as the metal shank piece of a shoe. In this connection, I have found it undesirable to have the strips of an electrode E of the grid type follow the general direction of this shank piece because the metal so distorts the field as to cause a concentration of the field, which results in a corona discharge and usually a spark from the corners of the shank piece, especially at the forward end thereof. If, however, the electrode strips are placed transversely of the sole in the shank portion, then the action of the shank piece on the field is divided into sections and there is substantially no danger of burning the leather. On the other hand, it is not desirable to have the electrode strips run transversely of the sole at the toe end thereof because of the tendency of the attaching machine to wrap a portion of the electrode around the toe of the sole, with the consequent displacement of the strips and a tendency to cause sparking at this neighborhood.

With this in view, an important feature of the invention resides in an electrode arrangement in which two groups of electrode strips are substantially normal to each other and in which they are so positioned that a large portion of the strips lie along lines substantially normal to the outline of a sole thus avoiding sparking, if the strips are bent up around the edge of the sole by the pressure of the pad. As herein illustrated, the strips forming the electrode grid extend transversely of the shank portion of the sole and longitudinally of the toe portion.

These and other features of the invention will be best understood from a consideration of the following description taken in connection with the accompanying drawing, in which Fig. 1 is an exploded angular view of two portions of the electrode structure, an upper layer of insulating material having been lifted to expose the grid arrangement of the electrode strips;

Fig. 2 is a side elevation, partly in section, through a sole-attaching machine in which the novel electrode is laid upon the surface of the pad; and Fig. 3 is a diagrammatic view showing the relation of the outline of the electrode grid to the outline of a shoe last, and especially to the metal shank piece of a shoe.

In sole-attaching machines of the character employed for the adhesive attachment of outsoles, a yielding pad 10 contained within a pad box 12 is usually employed. Such pads are elongated so that a shoe may be placed lengthwise thereof and are constructed and arranged, usually by shaping the pad itself, to receive the forepart of the shoe at one portion of the pad and to receive the shank portion of the shoe at another portion of the pad. Above this pad is positioned a shoe S built upon a last L. Such a shoe usually will contain an elongated metal strip 14 known as a shank piece. Between the sole A and the bottom of the shoe S there has been provided a film of adhesive which may be of the thermoplastic type and is usually applied while in solution to the margin of the overlasted upper on the shoe bottom and to the margin of the outsole, or at least to one of these. In the illustrated machine an electrode arrangement E in the form of a flexible sheet or pad cover is positioned directly beneath the sole and between it and the major portion of the pad. Then when pressure is applied through a suitable means, such as the abutments 16, and, concurrently or otherwise, a high-frequency, alternating current is supplied to the electrode through the leads 18, heat will be produced which will activate the adhesive, whereupon the supply of electricity is discontinued and the adhesive allowed to harden.

My novel electrode E comprises a top sheet 20 and a bottom sheet 22 of suitable, flexible, insulating material, such as "Fiberglass" yarn formed into a sheet with the aid of a suitable adhesive. Between these sheets is formed a grid structure embodying a plurality of interdigitated electrode strips 26, 28 arranged in order and here shown as substantially parallel. These strips are of conductive material, such as copper or other suitable metal, are flexible in themselves and are alternately connected to leads 18, enabling the current supplied to set up an electrostatic field between adjacent strips. It will be noted that the strips 26 of one group, which are located in the neighborhood of the shank portion of the shoe, extend transversely thereof and at substantially right angles to the metal shank piece 14. On the other hand, the strips 28 of the group underlying the forepart of the shoe extend lengthwise of the sole and hence are substantially normal to those in the first group. The adjacent pairs of strips in each group produce a series of individual electrostatic fields which are unlikely to be seriously distorted if the electrode structure E is bent up around the periphery of the sole by the action of the pad 10. A particularly good bonding effect is secured if the transverse strips are carried forward far enough to underlie the ball portion of the shoe, and it will be noted that a large portion of the strips are substantially normal to the outline of the sole. For convenience in manufacture, the strips 26, 28 and their connecting members 29, 30, and 32 are held in a predetermined spaced relation by means of a layer of insulating material 34, which is of the same order of thickness as the strips themselves and which is distributed over all the area of the insulating sheet 22 which is not occupied by the strips, thus preventing any indentation of the sole.

It will be understood that a series of direct, high-frequency fields are formed between adjacent electrode strips 26, 28 and that there is also formed a series of stray or fringe fields which bulge outwardly to intersect the adhesive layer which is to be activated. Heat is rapidly produced in the adjacent material, including the adhesive, by the series of fringe fields, so that the whole of the band of adhesive is thoroughly activated in only a few seconds. After activation, and the current has been turned off, the thermoplastic material will cool in a short time, whereupon the applied pressure may be removed and the shoe taken out of the machine.

Having thus described my invention, what I claim as new and desire to secure by Letters Patent of the United States is:

1. That method of attaching outsoles to shoes which consists in bringing together an outsole and a shoe between which there has been interpositioned a film of adhesive, causing the film of adhesive to be included in a stray electrostatic field derived from electrodes both of which are between the shoe and the pad of the sole-attaching machine, and pressing together said outsole and shoe.

2. That method of attaching an outsole to a shoe which consists in applying a film of adhesive to one of the surfaces which are to be brought into contact, allowing the cement to dry, bringing together the sole and the shoe and positioning them on electrodes adjacent to the surface of the pad of a sole-attaching machine, setting up direct and stray fields between said electrodes, subjecting the adhesive to the action of the stray field, and pressing together said outsole and shoe.

3. In a sole-attaching machine, a yieldable shoe-supporting pad one portion of which is constructed and arranged to receive the shank portion of a shoe, an electrode on said pad for association with the bottom of a shoe, said electrode comprising a plurality of conductive, flexible strips arranged in order and adapted to be alternately connected to opposite sides of a source of high-frequency electricity, those strips which are arranged to cooperate with the shank portion of a shoe extending substantially transversely of the shank-receiving portion of the pad, and means for pressing together a shoe and said electrode and pad.

4. In a sole-attaching machine, an elongated resilient shoe-supporting pad upon which a sole and shoe to be attached may be positioned lengthwise of the pad, an electrode for association with the bottom of a shoe on the pad, said electrode comprising a plurality of conductive flexible strips arranged in order and adapted to be alternately connected to opposite sides of a source of high-frequency electricity, those strips which are arranged to cooperate with the toe portion of the shoe extending substantially lengthwise of the pad, an abutment cooperating with the shoe to hold it against the sole, and means for causing relative movement of the abutment and the pad to press the sole against the shoe.

5. An electrode for association with the bottom of a shoe, said electrode comprising a plurality of conductive, flexible strips arranged in order and adapted to be alternately connected to opposite sides of a source of high-frequency electricity, some of said strips extending lengthwise of the shoe adjacent to the toe portion thereof and other strips extending transversely of the shank portion of the shoe.

GEORGE T. HART, Jr.